United States Patent [19]

Kobayashi et al.

[11] Patent Number: 4,791,719

[45] Date of Patent: Dec. 20, 1988

[54] METHOD OF MANUFACTURING A THIN-FILM MAGNETIC HEAD

[75] Inventors: Tetsuo Kobayashi, Kanagawa; Yukihisa Tsukada, Odawara; Shinji Narishige, Mito; Shinichi Hara, Hitachi, all of Japan

[73] Assignee: Hitachi, Ltd., Tokyo, Japan

[21] Appl. No.: 1,440

[22] Filed: Jan. 8, 1987

Related U.S. Application Data

[62] Division of Ser. No. 684,300, Dec. 20, 1984, abandoned.

[30] Foreign Application Priority Data

Dec. 22, 1983 [JP] Japan ................... 58-242882

[51] Int. Cl.⁴ .............................. G11B 5/127
[52] U.S. Cl. .................... 29/603; 156/643; 156/646; 156/652; 156/656; 156/659.1; 156/667
[58] Field of Search ............ 29/603; 156/643, 646, 156/652, 656, 659.1, 667; 360/122, 125, 126

[56] References Cited

U.S. PATENT DOCUMENTS

| 4,317,149 | 2/1982 | Elser et al. | 360/126 |
| 4,390,394 | 6/1983 | Mathuni et al. | 156/652 |
| 4,422,117 | 12/1983 | Nomura et al. | 360/126 |
| 4,436,593 | 3/1984 | Osborne et al. | 156/653 |
| 4,592,801 | 6/1986 | Hara et al. | 360/110 |

*Primary Examiner*—P. W. Echols
*Attorney, Agent, or Firm*—Antonelli, Terry & Wands

[57] ABSTRACT

A first magnetic layer is formed upon a non-magnetic substrate, a gap layer is formed upon the first magnetic layer, a conductor coil covered with an insulation layer is formed upon the gap layer, a second magnetic layer is formed upon the gap layer and the insulation layer, a magnetic gap being formed between the first and second magnetic layers at a front portion facing a recording medium, and the second magnetic layer being connected to the first magnetic layer at a back portion. After forming a mask made of metal oxide upon the second magnetic layer, the second magnetic layer, the gap layer, and the first magnetic layer are formed into a predetermined shape respectively at the tip portion by dry etching. Thus, a high performance thin-film magnetic head having the same widths for the first and second magnetic layers is obtained.

19 Claims, 4 Drawing Sheets

METHOD OF MANUFACTURING A THIN-FILM MAGNETIC HEAD

This is a division of application Ser. No. 684,300, filed Dec. 20, 1984 now abandoned.

BACKGROUND OF THE INVENTION

The present invention relates to a method of manufacturing a thin-film magnetic head and the structure thereof, and more particularly relates to a method for patterning a magnetic film constituting a magnetic core and the structure of a thin-film magnetic head obtained by using the patterning method.

The structure of an active region or element portion of a thin-film magnetic head is shown briefly in FIG. 1, and the method of manufacturing a thin-film magnetic head is generally described in the following.

In particular, a substrate 1 is formed with an under layer 2 thereupon, and a lower magnetic layer 3, a gap material 4, a conductor coil 5, an insulation layer 6, and an upper magnetic layer 7 are in this order respectively formed and etched to lay one upon another. After forming a passivation layer 8, a block including a thin-film magnetic head is cut out and subjected to necessary molding processings.

Among the above manufacturing processes, the processes for patterning the lower magnetic layer 3 and the upper magnetic layer 7 are required to have a satisfactory accuracy of dimension. In addition, it is required to make the track widths of the upper and lower magnetic layers as equal as possible, which layers appear in a finished magnetic head at a plane facing a recording medium, and also to attain a sufficient dimensional accuracy for the upper magnetic layer 7 so as to locate it entirely upon the lower magnetic layer 3. The improvement of those dimension accuracies is required particularly for a high recording density magnetic head of the type having the improved density of recording tracks.

In the method for patterning a magnetic material heretofore in use (U.S. Pat. No. 4,219,855), upper and lower magnetic layers are independently patterned and formed in a superposing relation to each other. Therefore, as shown in FIG. 2, at the plane of a front gap portion facing the medium, in order to make the upper magnetic layer 7 lay completely upon the lower magnetic layer 3, the upper track width $W_1$ of the lower magnetic layer 3 has been designed to be larger than the lower track width $W_2$ of the upper magnetic layer 7 by the order of 3 to 4μ, taking into consideration the alignment allowance and dimension allowance.

The magnetic head fabricated by the above method, however, has a larger track width of the lower magnetic layer 3 than the effective track width $W_2$. As a result, for example, if the magnetic head is utilized for a magnetic disk, recording signals in adjacent tracks are picked up as noises through the lower magnetic layer 3 so that a problem of degrading the S/N ratio arises.

SUMMARY OF THE INVENTION

It is an object of the present invention to provide a method for processing the track widths of upper and lower magnetic layers so as to have the same dimension, without degrading the magnetic layers.

It is another object of the present invention to provide a high quality and performance thin-film magnetic head.

The above objects of the present invention are achieved by a method of manufacturing a thin-film magnetic head wherein a magnetic core portion is divided into a lower magnetic layer and an upper magnetic layer, and after forming the upper magnetic layer in such a manner that a magnetic gap material, a conductor coil, and an intermediate insulation layer are provided between the upper and lower magnetic layers, a pattern is formed by etching; comprising the steps of forming on the upper magnetic layer an etching mask pattern made of material chemically stable and which may be contained in the thin-film magnetic head; and by using the mask pattern, trimming by ion milling both portions defining the track widths of the upper magnetic layer and the lower magnetic layer.

More particularly, the present invention features in that, the patterning process for the upper magnetic layer, first the upper magnetic layer is patterned by ion milling, and thereafter by using the same etching mask, the front gap portions of the gap material and the lower magnetic layer are trimmed, and furthermore in that metal oxide for use as a masking material in ion milling, such as aluminum oxide which is particularly low in ion milling speed, chemically stable, and which may be contained in the thin-film magnetic head, is used so as to eliminate a removal process of mask material after trimming and to prevent degrading the magnetic material while removing the mask material.

DESCRIPTION OF THE PREFERRED EMBODIMENTS

The embodiment of the present invention will now be described in detail with reference to the accompanying drawings.

Figure 1:
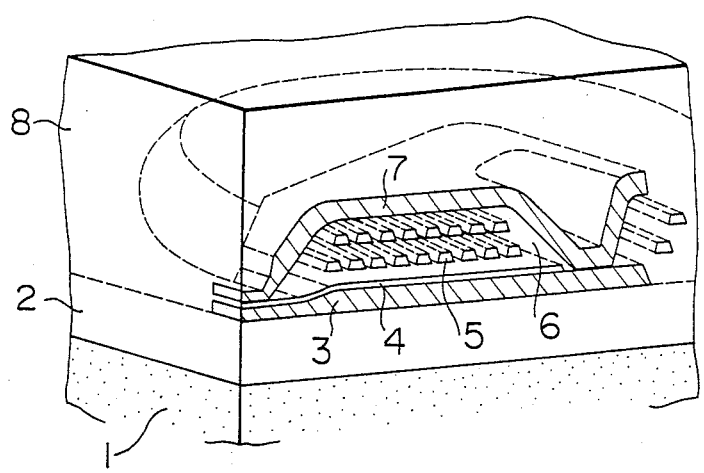
FIG. 1 is a perspective view showing an element portion of a magnetic head fabricated by a conventional manufacturing method.
Figure 2:
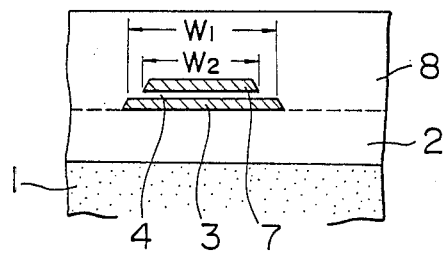
FIG. 2 is a transverse cross-sectional view of a front gap portion of the element portion.
Figure 3:
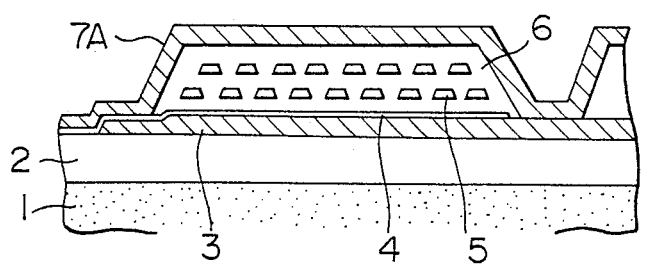
FIG. 3 is a vertical cross-sectional view of an element portion of a magnetic head according to an embodiment of the present invention.

FIG. 3 is a vertical cross-sectional view showing an element portion of a thin-film magnetic head according to an embodiment of the present invention. In the figure, reference numbers 1 to 6 are used to represent the constitutional elements identical to those shown in FIG. 1, and reference 7A denotes an upper magnetic layer formed over the whole surface of a substrate.

On the substrate 1 made of non-magnetic ceramic material, an under layer 2 made of metal oxide such as alumina is formed by sputtering. A lower magnetic layer 3 is formed by sputtering upon the under layer 2.

Succeedingly, a gap layer 4 made of metal oxide such as alumina is formed by sputtering upon the lower magnetic layer 3. An intermediate insulation layer 6 made of organic resin such as polyimide resin is applied evenly upon the gap layer 4. A conductor coil 5 is formed by sputtering upon the intermediate insulation layer 6, and thereafter an intermediate insulation layer 6 is again applied upon the conductor coil 5.

The intermediate insulation layer 6 is removed at a tip portion facing a recording medium. The intermediate insulation layer 6 and the gap layer 4 are removed to expose the lower magnetic layer 3 at a portion of an end portion opposite to the tip portion. Succeedingly, an upper magnetic layer 7A made of a material such as permalloy is formed by sputtering over the whole surface of the substrate 1.

Figure 4A:
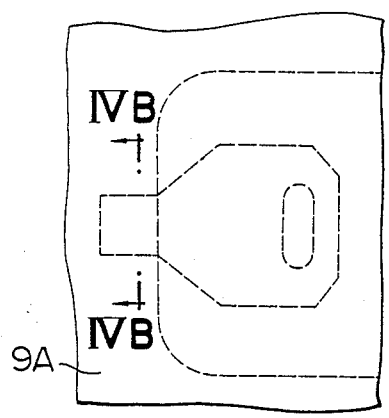
FIGS. 4A, 4B are respectively a plan view and a cross-sectional view showing the formation of a metal oxide layer.
Figure 4B:
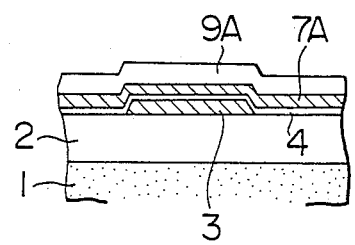

FIGS. 4A, 4B show the formation by sputtering of a metal oxide layer 9A upon the upper magnetic layer 7A, the metal oxide layer being used as a mask during ion milling. FIG. 4A is a plan view of the element portion, and FIG. 4B is a cross sectional view along line IVB—IVB of FIG. 4A. FIG. 4B is a transverse cross-sectional view of the front gap portion of the finished magnetic head, and corresponds to a plane facing a recording medium.

The metal oxide layer 9A may preferably be made of alumina or titania which are low in ion milling speed. Alumina in particular is the most suitable material because the ion milling speed is extraordinarily low. It is necessary to take into consideration the low step coverage while forming the metal oxide layer 9A.

Figure 5A:
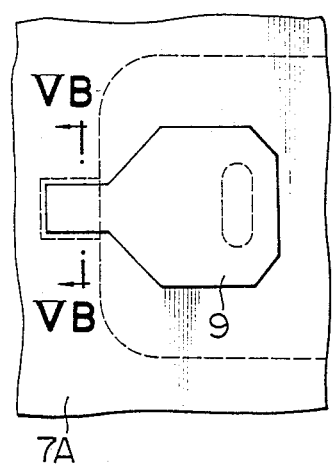
FIGS. 5A, 5B are respectively a plan view and a cross-sectional view showing the formation of a metal oxide mask.
Figure 5B:
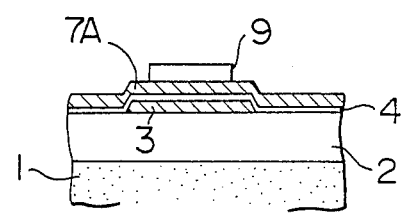

Thereafter, the metal oxide layer 9A is etched to obtain a metal oxide mask 9 as shown in FIGS. 5A and 5B. FIG. 5A is a plan view of the element portion, and FIG. 5B is a cross-sectional view along line VB—VB of FIG. 5A. It is difficult for dry etching, such as plasma etching or reactive sputter etching, to satisfactorily etch alumina or titania which is used as the material of the metal oxide layer 9. Therefore, for example, under $CF_4$ gas 100%, a reactive ion milling method is preferably used.

The details of the reactive ion milling method are described in the specification of Japanese Patent Application No. 58-144962.

In the present embodiment, the reactive ion milling for etching the metal oxide layer 9A was performed under the following conditions, by using as a mask a photoresist made of novolac resin base, or a metal layer such as permalloy or chrome.

Examples of the most suitable conditions for etching, for example, an alumina layer, are a $CF_4$ gas pressure of $2 \times 10$ Torr, an acceleration voltage of 800V, and an ion angle of incidence of 0 degree. With the reactive ion beam etching incorporated for the etching of the metal oxide layer 9A, the etching selectivity between the metal oxide layer 9A and the photoresist or metal mask is large, and moreover side etching is hardly brought about. Therefore, the taper angle at edges of a pattern becomes sharp so that a good dimensional accuracy may advantageously be obtained.

Figure 6:
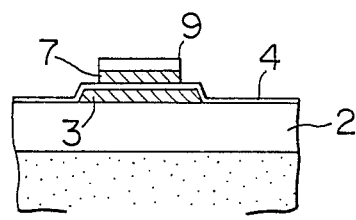
FIG. 6 is a cross-sectional view showing the upper magnetic layer after being etched.

Succeedingly, by ion milling using argon gas, the upper magnetic layer 7A is dry etched to obtain such a shape as shown in FIG. 6. Thereafter, in succession, the front gap portion at the lower magnetic layer 3 is trimmed through dry etching. In this case, the element portion except the front gap portion has to be prevented from being etched. Therefore, as shown in FIGS. 7A and 7B, photoresist is applied to form a photoresist mask 10 which exposes only a part of the intermediate insulation layer 6 generally made of organic resin and the front gap portion.

Figure 7A:
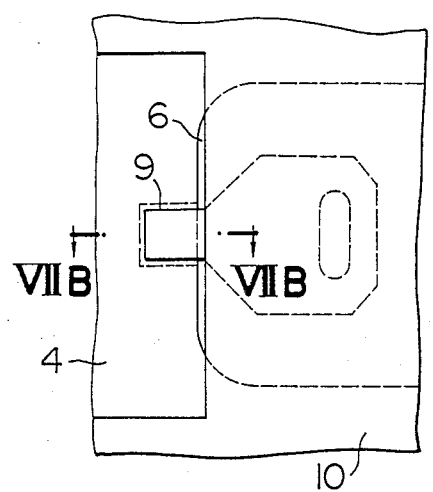
FIGS. 7A, 7B and 8A, 8B are respectively a plan view and a cross-sectional view for explaining a trimming method.
Figure 7B:
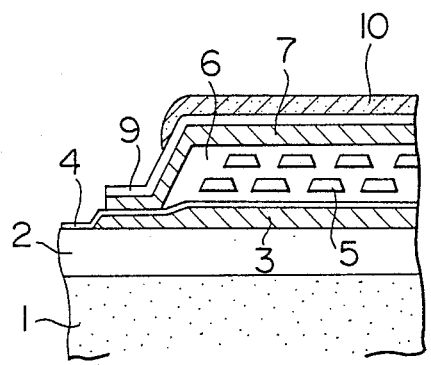

FIG. 7A is a plan view of the element portion, and FIG. 7B is a cross-sectional view along line VIIB—VIIB of FIG. 7A. By again ion milling using argon gas following the step in FIG. 7, only the exposed portion is etched, and the gap layer 4, lower magnetic layer 3, and metal oxide mask 9 are trimmed.

Since the gap layer 4 made of metal oxide such as alumina is formed thinly, the ion milling using argon gas can sufficiently be used for the etching. It is apparent that if required, the gap layer 4 and the lower magnetic layer 3 can again be trimmed through reactive ion milling using freon gas.

Figure 8A:
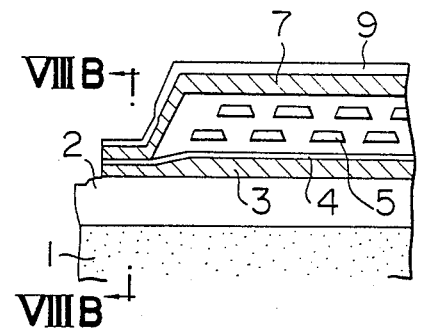
Figure 8B:
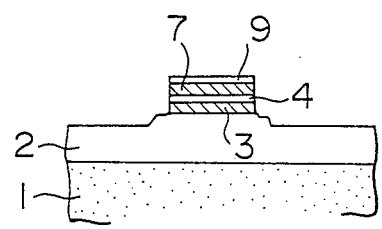
Figure 9A:
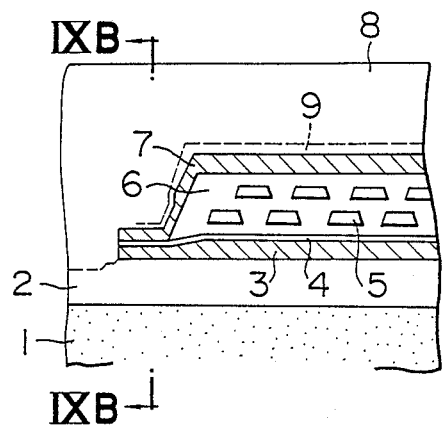
FIGS. 9A, 9B are cross-sectional views showing the formation of a passivation layer.
Figure 9B:
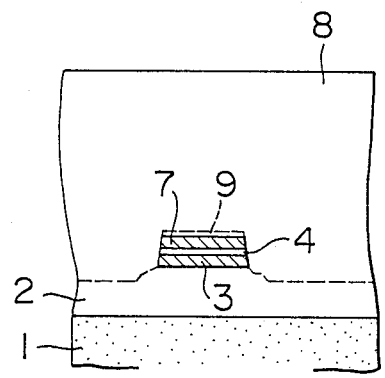

FIGS. 8A, 8B show cross-sectional views of the element portions wherein the photoresist mask has been removed by submerging in acetone liquid after the above trimming process. FIG. 8A is a vertical cross-sectional view, and FIG. 8B is a cross-sectional view along line VIIIB—VIIIB of FIG. 8A. Thus, as shown in the figures, it is possible to make the track widths of the lower magnetic layer 3 and the upper magnetic layer 7 substantially equal to each other. Thereafter, without removing the metal oxide mask 9, a passivation mask 8 made of metal oxide such as alumina is formed by sputtering, and the surface of the passivation mask 8 is processed to make it smooth and even to obtain a shape shown in FIGS. 9A and 9B. To obtain a finished magnetic head, the element portion is cut along line IXB—IXB. FIG. 9A is a vertical cross sectional view of the element portion, and FIG. 9B is a cross sectional view along line IXB—IXB.

In the above embodiment, if all of the under layer 2, gap layer 4, passivation layer 8, and metal oxide mask 9 are made using alumina which is a stable metal oxide, a highly reliable magnetic head may advantageously be obtained which has high stability against erosion, abrasion, and the like. The reason for this is that the magnetic material appears, at the medium facing plane of the finished magnetic head, in the form fully embedded in the alumina layers.

Further, it is obvious that instead of the metal oxide mask, other materials may be used which pose no obstacles even if left in the magnetic head.

As described above, the construction of the present invention features a method of manufacturing a thin-film magnetic head wherein a magnetic core portion is divided into a lower magnetic layer and an upper magnetic layer, and after forming the upper magnetic layer in such a manner that a magnetic gap material, a conductor coil, and an intermediate insulation layer are provided between the upper and lower magnetic layer, a pattern is formed by etching; comprising the steps of forming on the upper magnetic layer an etching mask pattern made of material chemically stable and which may be contained in the thin-film magnetic head; and by using the mask pattern, trimming by ion milling both portions defining the track widths of the upper magnetic layer and the lower magnetic layer. Therefore, even if the accuracy of alignment between the upper and lower magnetic layers is poor in the manufacturing processes, the final widths of the upper and lower magnetic layers appearing at the medium facing plane are not deviated in position from each other, and moreover can be processed to have the same dimensions. Thus, it is possible to fabricate a high quality and high performance magnetic head with ease.

We claim:

1. A method of manufacturing a thin-film magnetic head for recording information in a magnetic recording medium comprising the steps of:
   (a) forming a first magnetic layer over a non-magnetic substrate,
   (b) forming a gap layer over said first magnetic layer,
   (c) forming a conductor coil covered with an insulation layer over said gap layer,
   (d) forming a second magnetic layer over said gap layer and said insulation layer, a magnetic gap being formed between said first and second magnetic layers at a tip portion facing a recording medium, and said second magnetic layer being connected to said first magnetic layer at an end portion opposite to said tip portion,
   (e) forming a mask made of metal oxide over said second magnetic layer, and
   (f) forming said second magnetic layer, said gap layer, and said first magnetic layer respectively at said tip portion into a predetermined shape by etching using said mask made of metal oxide, wherein at least said gap layer and said first magnetic layer are formed into said predetermined shape by dry etching after forming a photoresist layer over said second magnetic layer except at said tip portion.

2. A method of manufacturing a thin-film magnetic head as set forth in claim 1, wherein said metal oxide is either alumina or titania.

3. A method of manufacturing a thin-film magnetic head as set forth in claim 2, wherein after forming a metal oxide layer upon said second magnetic layer, said mask is formed by etching said metal oxide layer through a reactive ion milling using freon gas.

4. A method of manufacturing said thin-film magnetic head as set forth in claim 1, wherein after forming a metal oxide layer upon said second magnetic layer, a mask is formed by etching said metal oxide layer through a reactive ion milling using freon gas.

5. A method of manufacturing a thin-film magnetic head as set forth in claim 1, wherein said metal oxide is alumina.

6. A method of manufacturing a thin-film magnetic head as set forth in claim 1, wherein said mask made of metal oxide is formed by sputtering a layer of metal oxide and patterning said layer of metal oxide into a predetermined shape by reactive ion milling.

7. A method of manufacturing a thin-film magnetic head as set forth in claim 1, wherein said dry etching is ion milling.

8. A method of manufacturing a thin-film magnetic head for recording information in a magnetic recording medium comprising the steps of:
   (a) forming a first magnetic layer over a non-magnetic substrate,
   (b) forming a non-magnetic gap layer upon said first magnetic layer,
   (c) forming an insulation layer upon said gap layer,
   (d) forming a conductor coil upon said insulation layer,
   (e) forming again an insulation layer so as to cover said conductor coil,
   (f) forming a second magnetic layer upon said gap layer and said insulation layer, a magnetic gap being formed between said first and second magnetic layers at a tip portion facing a recording medium, and said second magnetic layer being connected to said first magnetic layer at an end portion opposite to said tip portion,
   (g) forming a metal oxide layer upon said second magnetic layer,
   (h) forming a mask by etching said metal oxide layer by reactive ion milling using freon gas,
   (i) forming said second magnetic layer, said gap layer, and said first magnetic layer into a predetermined shape respectively at said tip portion by dry etching to form a superposed body, wherein at least said gap layer and said first magnetic layer are formed into said predetermined shape by dry etching after forming a photoresist layer over said second magnetic layer except at said tip portion, and
   (j) forming a passivation layer upon said superposed body.

9. A method of manufacturing a thin-film magnetic head as set forth in claim 8, wherein said metal oxide is either alumina or titania.

10. A method of manufacturing a thin-film magnetic head as set forth in claim 8, wherein said metal oxide is alumina.

11. A method of manufacturing a thin-film magnetic head as set forth in claim 8, wherein said mask made of metal oxide is formed by sputtering a layer of metal oxide and patterning said layer of metal oxide into a predetermined shape by reactive ion milling.

12. A method of manufacturing a thin-film magnetic head as set forth in claim 8, wherein said dry etching is ion milling.

13. A method of manufacturing a thin-film magnetic head for recording information in a magnetic recording medium comprising the steps of:
   (a) forming an under layer upon a substrate,
   (b) forming a first magnetic layer upon said under layer,
   (c) forming a non-magnetic gap layer upon said first magnetic layer,
   (d) forming a conductor coil covered with an insulation layer over said gap layer,
   (e) forming a second magnetic layer upon said gap layer and said insulation layer, a magnetic gap being formed between said first and second magnetic layers at a tip portion facing a recording medium, and said second magnetic layer being connected to said first magnetic layer at an end portion opposite to said tip portion,
   (f) forming a mask made of metal oxide upon said second magnetic layer,
   (g) forming said second magnetic layer, said gap layer, and said first magnetic layer into a predetermined shape respectively at said tip portion by dry etching to form a superposed body, wherein at least said gap layer and said first magnetic layer are formed into said predetermined shape by dry etching after forming a photoresist layer over said second magnetic layer except at said tip portion, and
   (h) forming a passivation layer upon said superposed body.

14. A method of manufacturing a thin-film magnetic head as set forth in claim 13, wherein said metal oxide is either alumina or titania.

15. A method of manufacturing a thin-film magnetic head as set forth in claim 13, wherein said metal oxide is alumina.

16. A method of manufacturing a thin-film magnetic head as set forth in claim 13, wherein said mask made of metal oxide is formed by sputtering a layer of metal oxide and patterning said layer of metal oxide into a predetermined shape by reactive ion milling.

17. A method of manufacturing a thin-film magnetic head as set forth in claim 14, wherein said dry etching is ion milling.

18. A process of manufacturing a thin-film magnetic head for recording information in a magnetic recording medium comprising the steps of:
   (a) forming an under layer upon a non-magnetic substrate,
   (b) forming a first magnetic layer upon said under layer,
   (c) forming a non-magnetic gap layer upon said first magnetic layer,
   (d) forming an intermediate insulation layer made of organic resin upon said gap layer,
   (e) forming a conductor coil upon said intermediate insulation layer,
   (f) forming again an intermediate insulation layer made of organic resin so as to cover said conductor coil,
   (g) removing said intermediate layer so as to expose said gap layer at a tip portion facing a recording medium,
   (h) removing parts of said intermediate insulation layer and gap layer so as to expose said first magnetic layer at a portion of an end portion opposite to said tip portion,
   (i) superposing a second magnetic layer such that a magnetic gap is formed between said first and second magnetic layers at said tip portion and that said second magnetic layer is connected to said first magnetic layer at said end portion,
   (j) forming a metal oxide layer upon said second magnetic layer,
   (k) patterning said metal oxide layer by a reactive ion milling using 100% $CF_4$ gas,
   (l) patterning said first magnetic layer by a dry etching using said patterned metal oxide layer as a mask to form a superposed body,
   (n) masking, using a photoresist, a portion of said superposed body excluding said tip portion,
   (o) removing said photoresist, and
   (p) forming a passivation layer upon said superposed body.

19. A method of manufacturing a thin-film magnetic head as set forth in claim 18, wherein said metal oxide is either alumina or titania.

* * * * *